United States Patent [19]

Reichenbach

[11] Patent Number: 6,021,885
[45] Date of Patent: Feb. 8, 2000

[54] ROTARY DRIVE DEVICE WITH AXIALLY MOVABLE RECEPTACLE

[75] Inventor: Jens Reichenbach, Hamburg, Germany

[73] Assignee: Basler AG, Germany

[21] Appl. No.: 08/810,573

[22] Filed: Mar. 3, 1997

[30] Foreign Application Priority Data

Mar. 7, 1996 [DE] Germany .......................... 196 08 562

[51] Int. Cl.[7] .................................................. G11B 17/028
[52] U.S. Cl. .................. 198/379; 198/346.2; 360/99.04; 360/99.09; 369/266; 369/270
[58] Field of Search ................ 198/379, 346.2, 198/395; 360/99.04, 99.09, 266, 270, 271; 369/266, 270, 271

[56] References Cited

U.S. PATENT DOCUMENTS

| | | | |
|---|---|---|---|
| 3,867,724 | 2/1975 | Bruer et al. | 369/270 X |
| 4,004,815 | 1/1977 | Watanabe | 369/266 X |
| 4,073,496 | 2/1978 | Barlow | 369/266 X |
| 4,305,145 | 12/1981 | Hughes et al. | 369/270 X |
| 4,326,284 | 4/1982 | Elliott | 369/270 X |
| 4,541,086 | 9/1985 | Tanaka | 369/270 X |
| 4,737,948 | 4/1988 | Okita | 369/270 X |
| 4,754,445 | 6/1988 | Young et al. | 198/346.2 X |
| 4,855,990 | 8/1989 | Akiyama | 369/270 X |
| 5,001,700 | 3/1991 | Rowden et al. | 369/270 |
| 5,006,945 | 4/1991 | Furusawa | 369/270 X |
| 5,048,005 | 9/1991 | Ekhoff | 369/270 |
| 5,056,082 | 10/1991 | Ekhoff | 369/270 |
| 5,631,894 | 5/1997 | Takahashi | 369/270 |

FOREIGN PATENT DOCUMENTS

3132919 A1   9/1982   Germany .

*Primary Examiner*—Robert P. Olszewski
*Assistant Examiner*—Gerald O'Connor
*Attorney, Agent, or Firm*—Howson and Howson

[57] ABSTRACT

A rotary drive device for a flat object which is transported by a conveyance means to a processing station. At the processing station the object is rotated about an axis orthogonal to its surface extension by the rotary drive device. The rotary drive device includes a receptacle for the object and an axially projecting guidance means which cooperates with a hole in the object to center the object. When the object is positioned on the conveyance means above the receptacle, the object can be connected to the receptacle free of rotational play by a releasable fixation means. The receptacle is arranged on a rotatable plunger that can be moved back and forth so that elaborate pivoting and lowering motions of the conveyance means is not required.

21 Claims, 5 Drawing Sheets

ROTARY DRIVE DEVICE WITH AXIALLY MOVABLE RECEPTACLE

FIELD OF THE INVENTION

The invention pertains to a rotary drive device for a flat object which is transported by a conveyance means to a processing station, in which the object is rotated during processing about an axis orthogonal to its surface extension by the rotary drive device, which contains a receptacle for the object and at least one guidance means projecting axially for centering the object that cooperates with a corresponding hole or recess in the object, and the object can be positioned by the conveyance means above the receptacle, and releasable fixation means are provided to connect the object to the receptacle free of rotational play.

Specifically, the present invention pertains to a rotary drive device for a compact disc (CD). Moreover, processing is to be understood below to mean, in addition to an actual modification of the object, the examination in particular, for instance, the optical examination of the quality of the object. Below, the examination of a CD is primarily intended, without any limitation being connected therewith.

BACKGROUND OF THE INVENTION

Such processing stations are subsections of a production line in which CDs or other objects are produced section by section. Conveyance means and manipulator means are provided between the individual stations to transport the CD from a receptacle of one station to the receptacle of the next station. The conveyance means here can be realized as vacuum grippers or have, for instance, fork-shaped or annular supports on which the CD rests only at its edge area. The supports can also be provided with a conical internal wall, so that the CD makes contact only with its edge.

The object is housed by the receptacle and separated from the conveyance means, the receptacles for a CD being constructed such that they cooperate with the center hole of the CD. For this purpose, the receptacle has a peg-shaped, normally conical free end, which is adjoined by a flange-shaped shoulder extending perpendicular to the axis of rotation. The peg-shaped end serves as a guidance means, with the placement and centering of the CD being eased by the conicity. The axial orientation of the CD with respect to the processing station is defined by the shoulder. Depending on the type of processing being performed in the respective station, the receptacle can be constructed to be rotating or stationary. Particularly for a rotating receptacle, releasable fixation means or tensioning means are provided, in order to clamp the CD free of rotational play on top of the shoulder.

The processing stations are frequently constructed such that the CD is set down on the receptacle in a horizontal orientation. This has the advantage that the conveyance means can hold and transport the CD only based on its own weight, so that other clamping means are not required. The receptacle of a station in which the CD is processed while rotating is vertically oriented and can be rotated about a vertical axis.

Optical measuring methods are generally employed in examining a CD in order to examine the upper or lower side. First of all, it is necessary here that the CD have an exact and reproducible position in the receptacle. Second, it is necessary that the CD be rotated at least once about its axis of rotation, which runs perpendicular to its surface extension, in order to cover the entire surface with a linear scan.

Therefore, high demands are placed on the receptacle of a processing station with regard to exact rotary seating. To achieve a flawless measurement, it must be assured in particular that rotary driving is done without slippage. Because of these high demands, arranging the rotatable receptacle axially fixed in the processing station is a known measure.

This has the disadvantage that the conveyance means must perform complicated pivoting and lowering movements to first position the CD above the free end of the receptacle and subsequently to guide it down to the seat. Specifically, tumbling movements often occur then, which make a defined clamping and exact positioning impossible. There also exists the danger that the center hole is not moved over the conical free end of the receptacle and the CD falls past it and could thus cause a disruption of production. Moreover, the CD must then be lifted off the receptacle, which again requires the lowering motion of the conveyance means. The required pivoting motion of the conveyance means, on which several CDs are generally transported, is not easily performed, especially not in a short time, because of the relatively large mass involved.

OBJECT OF THE INVENTION

The invention is therefore based on the problem of constructing a rotary drive device of the type described initially such that the motion of the conveyance or manipulator means can be considerably simplified. It is to be achieved in particular that the conveyance means must perform a motion in only one plane, such as the horizontal one.

SUMMARY OF THE INVENTION

The problem is solved according to the invention in that the receptacle is arranged on a rotatable plunger that can be moved up and down axially. This arrangement has the advantage that the CD or the object need only be moved over the receptacle by the conveyance means such that the center hole or a corresponding recess lies flush with the guidance of the receptacle. The introduction of the free end into the centering hole and the centering of the CD caused thereby is accomplished by the axial motion of the plunger.

The sequence of the production line is also not hindered by this axial and linear motion of the receptacle in the direction towards the conveyance means, since the objects are moved and processed step by step and the conveyance means is timed in a corresponding step-by-step sequence and generally remains above the processing station during the processing time. Even with an annular design of the support in the conveyance means, into which the receptacle would then protrude, the operating sequence would not be disturbed. In principle, however, the construction of the conveyance means is arbitrary, so long as in the case of a CD the center hole is exposed for the insertion of the free end of the receptacle.

According to an embodiment of the invention, it is provided that the plunger can be moved back and forth by a pneumatic or hydraulic piston drive. This has the advantage of the ability to utilize pneumatic or hydraulic medium sources that are present in any case on a production line. There is also an advantage in the fact that the plunger can be triggered quickly, especially with a pneumatic drive.

It is also possible to provide damping means to reduce the stroke velocity of the plunger at least before contact of the receptacle with the object. This has the advantage that the movement sequence of the plunger can be optimized.

It should be noted fundamentally here that only a small period of time is available for a processing step or an examination. Because of this fact, the transport motions of the CD during which no processing is occurring must be performed as rapidly as possible so that sufficient time for the actual processing is available in the cycle period. It is therefore practical to move the plunger up to the CD as rapidly as possible. In the case of an inexact positioning of the center hole, however, this can cause the CD to be removed from the conveyance means in an uncontrolled manner because of the abrupt motion, so that the CD may not be properly clamped by the clamping means. The stroke velocity of the plunger is reduced by the damping means, so that the CD can be properly grasped.

In the case sufficient time is available, however, the stroke motion in the direction of the object can of course be performed completely at an appropriate velocity. It can be practical in any case to construct the piston drive with a double-acting cylinder. This has the advantage that with appropriate control means, for instance, the stroke in the direction towards the object, that is the extension of the plunger, can be performed at a different velocity than the retraction of the plunger, that is, the stroke in the opposite direction.

According to a further elaboration of the invention, the plunger is guided secured against torsion, that is, free of rotational play, in a sleeve seated so as to be able to rotate. The sleeve here may be able to be rotated by a drive motor. This also has the advantage that slippage-free rotational driving of the receptacle is possible, despite the axially displaceable plunger. The rotary motion and the stroke motion here are completely separated, so that each motion can be optimized for precision.

It can be practical in this case if the nonrotating linear guide has balls guided in axial grooves of the sleeve and the plunger. This has the advantage that, first, an exact axial guidance of the plunger without tilting motions can be realized. Second, there is an advantage in the fact that the plunger is seated so as to move easily. Thus the force required is small, and the piston drive can be dimensioned correspondingly small.

In another embodiment of the invention, the sleeve is connected to a drive motor via a belt. This has the advantage that the rotary drive device and the drive motor can be located on the same side with respect to the plane formed by the CD. This brings about a compact structure and the area opposite the rotary drive device, the upper side of the processing station, that is, can be completely free.

It can also be practical for the piston drive to be arranged parallel alongside the sleeve and connected via a crosspiece to the plunger. In this way, a compact structure can be achieved, which is advantageous for certain processing stations, namely if no space is available in the axial extension of the plunger's stroke motion.

It is essential that a clamping means be present in order to connect the object free of rotational play to the receptacle. It can be provided that the clamping means is constructed as a pressure pad arranged on the side opposite the receptacle in order to clamp the object tightly between the receptacle and the pressure pad. This structure can generally be produced economically, but has the disadvantage that it must be arranged on the side of the processing station on which the conveyance means also moves. Therefore, hindrances cannot be ruled out. This may be disadvantageous if the processing station is retrofitted as a separate part, so that an installation of a pressure pad at this later time is not always possible.

According to a practical embodiment of the invention, it is therefore provided that the clamping means are arranged on the receptacle. It is possible to provide for the receptacle to protrude at its free end through the hole in the object and to provide clamping means which can be extended axially and radially, such as extensible balls that clamp the object firmly to the shoulder. It is then practical if the balls can be extended by an actuator operated by pressure. These clamping balls are generally known and do not require any further explanation at this point.

According to a preferred embodiment, it is provided that the shoulder of the receptacle is constructed in the shape of a flange and that at least one hole is provided on its surface facing the object which can be subjected to a vacuum in order to draw the object down tightly. This has the advantage that, in contrast to mechanical clamping means, the CD is not warped or deformed. It also makes it possible to do without mechanically movable parts. These vacuum grippers are generally known and do not require any further explanation at this point.

In detail, the arrangement may be made such that the plunger has at least one channel which is connected at one end to the holes of the receptacle's shoulder and at its other end to a vacuum source. The term vacuum source here is taken to mean devices that can generate a vacuum. A rotatable pneumatic connector of the generally known type, which allows a free rotation of the plunger even with vacuum applied, is provided on the side opposite the receptacle.

It can be particularly practical for switching means or valves to be present which turn on or establish a connection to the vacuum source during the stroke motion of the plunger even before contact of the receptacle's shoulder with the object. This has the advantage, first, that a vacuum has already built up when the receptacle or shoulder comes into contact with the CD. Second, any possible tilting motions of the CD can be damped by the already established suction effect. A rapid and secure fixation of the CD on the receptacle can thus be established.

The invention additionally pertains to a processing station for a flat object, particularly a disc or CD, which is rotated in the processing station during processing about an axis orthogonal to its surface extension. According to the invention, the processing station is equipped with a rotary drive device as described above. The provision of a processing station with such a rotary drive device has the advantage that an adaptation of the conveyance means to the receptacle of the processing station can be achieved much more simply. It is merely necessary that the horizontal position of the CD or other flat object be adapted to the position of the receptacle. The axial insertion of the receptacle and the separation of the object from the conveyance means is brought about by the stroke of the plunger. Such a station can thus easily be retrofitted or combined with other stations.

According to another embodiment, it is provided that the drive motor and the rotary drive device are arranged perpendicular to the axis of rotation on the same side. By using, for instance, a driven rotatable sleeve in which the plunger is seated in a linear guide without rotational play, this is possible easily and with a high accuracy of both the reproducible rotational motion and the reproducible axial motion. The special advantage here is that the surface of the CD which is not in contact with the receptacle can be accessed with complete freedom, so that no hindrance of the conveyance means is to be expected. This advantage is also achieved when the clamping means for fixing the CD in place are arranged directly on the receptacle.

BRIEF DESCRIPTION OF THE DRAWINGS

The invention will be described below in further detail on the basis of the schematic drawings. These show in FIG. 1: a rotary drive device according to the invention in cross section.

DETAILED DESCRIPTION OF THE PREFERRED EMBODIMENT

Figure 5:
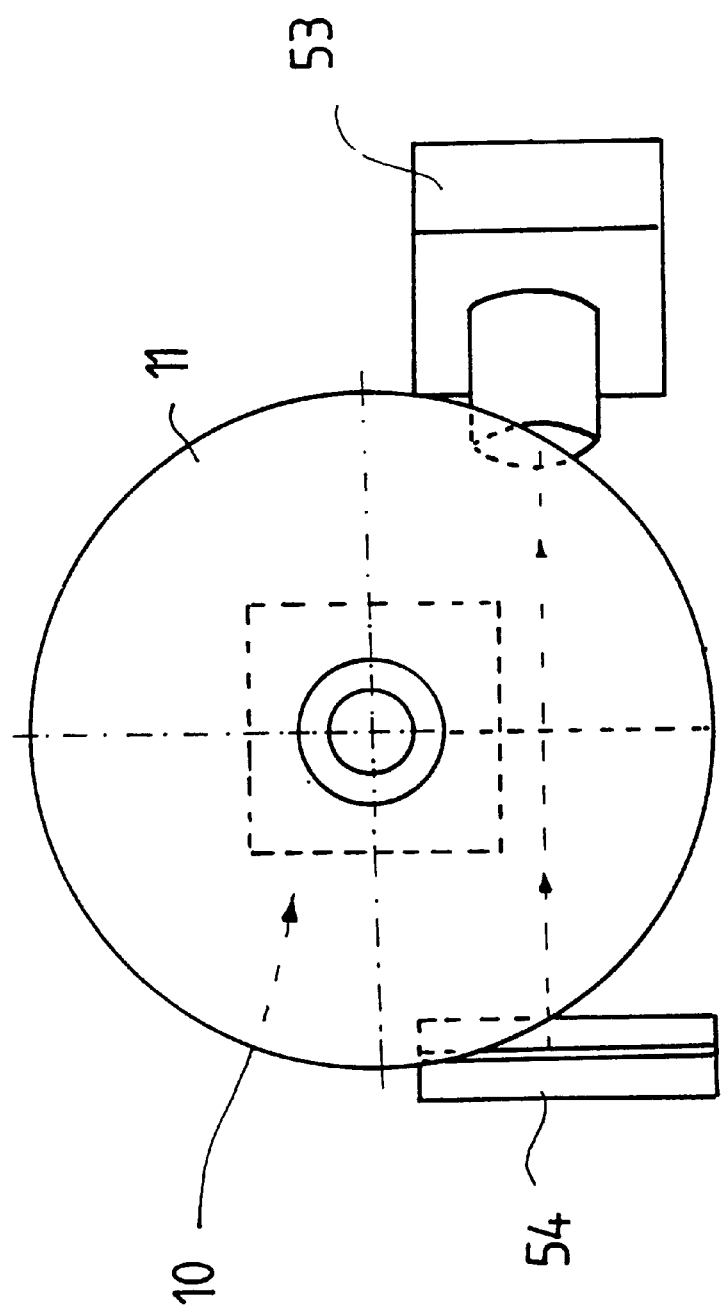
FIG. 5 is a top plan of a view of a CD which is located on the rotary drive device and which is being optically inspected.

The rotary drive device 10 presented in the drawings serves for rotatably holding a CD 11 in a processing station, for instance, as illustrated in FIG. 5. This processing station can be constructed for instance as a monitoring station, in which the underside of the CD is scanned by optical methods and examined for possible flaws. In detail, the arrangement is chosen such that the CD 11 is conveyed in a horizontal position to the processing station.

In order to hold the CD 11, the rotary drive device 10 has a receptacle 12 which is provided at its free end facing the CD 11 with a guide peg 13 that tapers conically towards the free end. This peg 13 is dimensioned to correspond to the center hole 14 of the CD and serves for centering the CD 11 on the receptacle 12. The receptacle 12 furthermore has a flange-shaped shoulder 15 that adjoins the guide peg 13. This shoulder 15 serves as a support for the CD 11.

The dimensions of the flange-shaped shoulder 15 are selected such that the CD contacts the shoulder 15 only at the inner border of its lower surface 43 facing the center hole 14. Thus it is guaranteed that the remaining area situated further outwards, in which the data area of a CD is located, is free and not covered by the shoulder. The underside is then accessible without problems to an optical testing method.

In principle the nature of the surface 28 of the shoulder is arbitrary and can be provided with a rubber-like layer for better adhesion. In order to enable an exact alignment of the CD on the shoulder in the stroke direction, however, it is practical to manufacture the surface from an inelastic material, particularly metal. In this way an exact optical position of the CD is assured with respect to the optical elements necessary, for instance, for an optical examination of the CD, in order to enable a flawless coverage of the surface.

Figure 2:
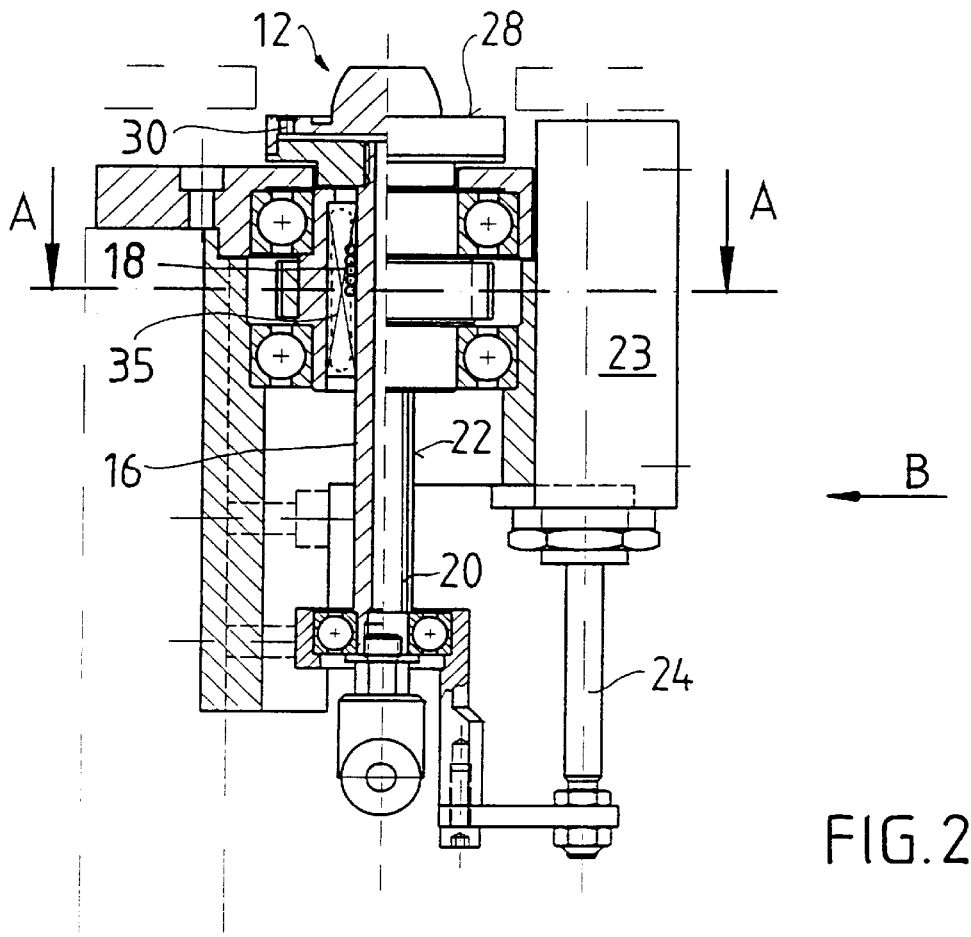
FIG. 2: the section of FIG. 1, but with a retracted plunger.
Figure 3:
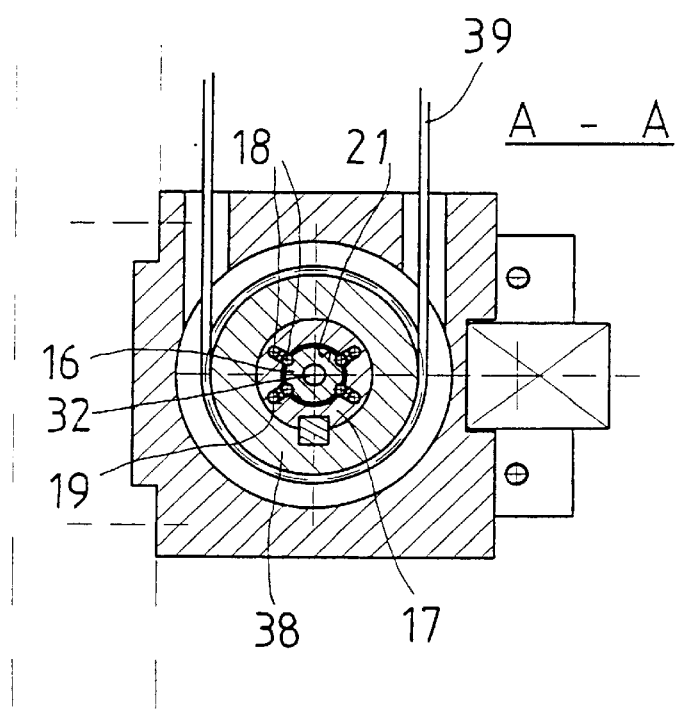
FIG. 3: a section along the line A—A in FIG. 2.

The receptacle 12 is arranged on a plunger 16 that can be moved back and forth axially. In detail, the arrangement is chosen such that the plunger 16 can be moved in a stroke-like fashion between a retracted position according to FIG. 2 and an extended position according to FIG. 1, in which the CD 11 is gripped by the receptacle 12 and separated from the conveyance means. For this purpose, the plunger 16 is seated in a rotatable sleeve 17 in a linear guide 35 without rotational play. In the illustrated embodiment, the nonrotating linear guide has, as is evident from FIG. 3, balls 18 that are guided in groove 19,20 running axially in interior wall 21 of the sleeve 17 and the exterior wall 22 of the plunger 16, respectively. Due to this bearing arrangement, the plunger 16 is seated in the sleeve 17 by means of a roller bearing both free of play, i.e., without tilting motions of the plunger, and also with low friction.

In the embodiment illustrated in the drawings, the plunger 16 is constructed with a circular cross section, while the sleeve 17 has a corresponding circular hole. Other cross-sectional forms can be provided, but circular cross sections can be produced simply and with high precision.

The stroke motion of the plunger 16 is brought about by a pneumatic piston cylinder drive 23, not shown in greater detail. The stroke of the piston and thus of the plunger can be adjusted and limited in both the extension and retraction directions by stops, not shown.

In principle, this piston cylinder drive 23 can be arranged in the axial extension of the plunger, that is, underneath the plunger 16. Frequently, however, no space is available there for such a drive. In the embodiment shown in the drawings, the piston cylinder drive is therefore arranged alongside the sleeve. The piston rod 24 of the piston cylinder drive is connected via a crosspiece 25 to the plunger 16 in the area 26 of the latter facing away from the receptacle. The crosspiece 25 is connected to the plunger so as to be rotated on, for instance a ball bearing 27 that is supported on a shoulder 44 of the plunger 16 and thus axially fixed in place.

The pneumatic piston cylinder drive can be constructed as a double-acting cylinder. This has the advantage that the downward motion of the plunger 16 can also be accomplished by pressure. A damping element, not shown, may also be present to reduce the stroke velocity of the piston at least immediately before reaching the extended position, that is when the CD is, touched by the receptacle, in order to avoid an impact-like contact.

For holding the CD 11 free of rotational play on the receptacle 12, the latter is constructed as a vacuum receptacle. To accomplish this, openings 30 that can be subjected to a vacuum are provided on the surface 28 of the flange-like shoulder 15. The arrangement is chosen in detail such that the openings 30 are connected via radial channels 31 or an intermediate space to a second channel 32 in the plunger 16. This channel 32 preferably runs centrally inside the plunger 16 in order to avoid imbalances. At its end pointing away from the receptacle 12, the plunger 16 is provided with a rotatable connector coupling 33 that can be connected to a vacuum source. Due to this arrangement, it is possible for the receptacle to be rotated arbitrarily. It is possible, in particular, to provide only one direction of rotation, since a backward rotation of the plunger is not required.

Figure 6:
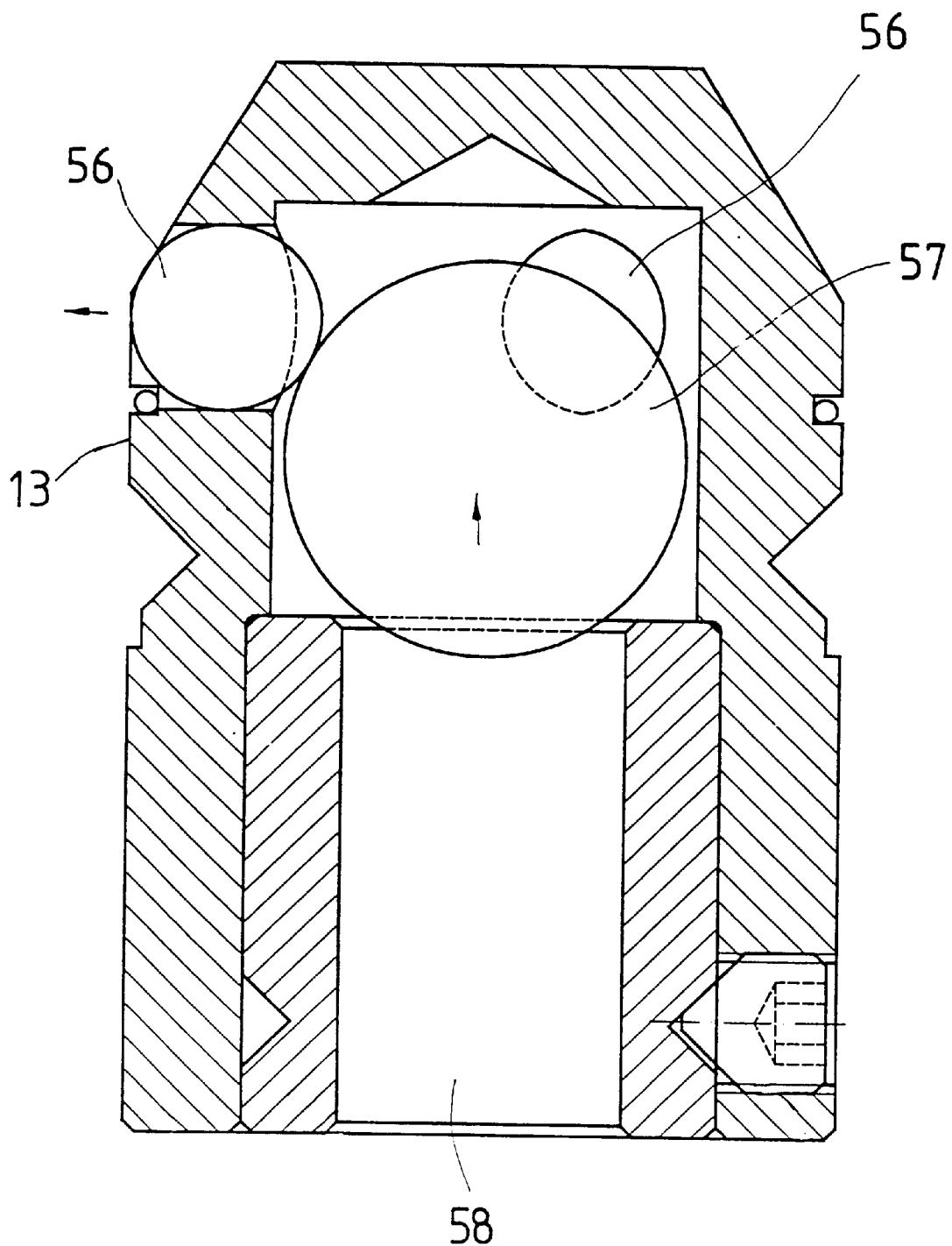
FIG. 6 is a cross-sectional view of an alternate embodiment of a clamping means utilized on the guide peg of the rotary drive device.

By means of this arrangement, the CD 11 is held on the receptacle 12 by vacuum. It is also possible to provide clamping balls 56 that can be extended radially out of the conical peg 13. Here a piston, such as an actor 57 illustrated in FIG. 6, can be provided inside the plunger 16 which can be subjected to an overpressure via channel 58 by means of the connector coupling 33. It is also possible to provide a pressure pad 51 that is arranged on the side 34 opposite the receptacle.

The sleeve 17 can be rotated on ball bearings 36 in the frame 37 (not shown in further detail) of the rotary drive device 10. This sleeve 17 serves simultaneously to place the plunger 16 and thus the receptacle 12 with the CD 11 for processing into a rotational motion about the axis of rotation 29, which is vertical in this embodiment. For this purpose, a toothed belt wheel 38 is provided which is rigidly connected to the sleeve 17. The toothed belt wheel can be connected, for instance, via a toothed belt 39 to the drive motor 40. Since the plunger is guided without rotational play in the sleeve 17 and the CD is fixed without rotational play on the receptacle 12 by the vacuum, a slippage-free rotational driving of the CD 11 can be accomplished, which is required for a flawless processing, especially a flawless examination of the CD.

Figure 4:
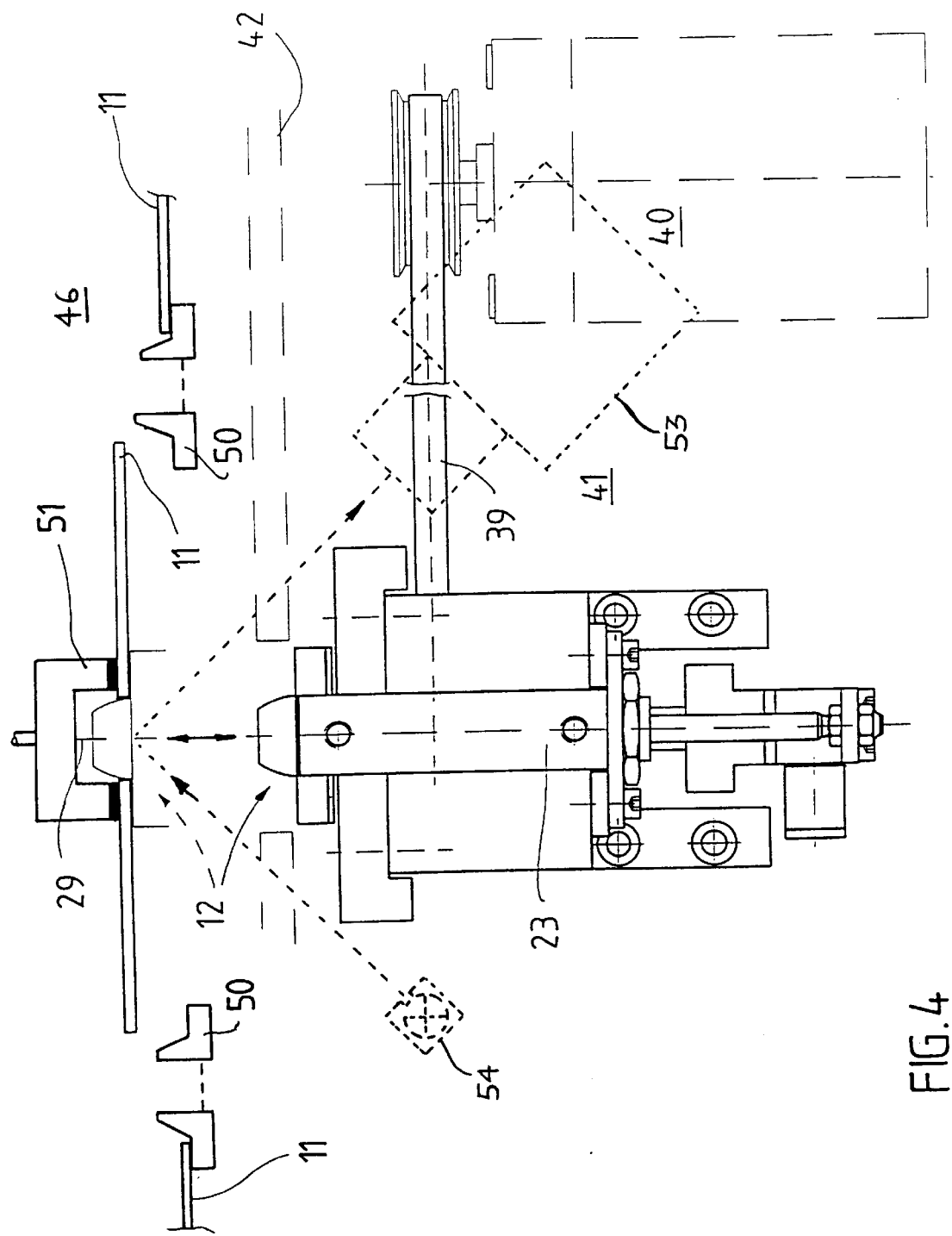
FIG. 4: a view in the direction of arrow B in FIG. 2

It is obvious that with such a rotary drive device 10 it is possible in a production line, at least for this station, to employ a conveyance means 50 which moves the CD merely in one plane, the horizontal one in this embodiment, and positions it with the center hole 14 over the peg 13 of the receptacle 12. The additional advantage is particularly evident from FIG. 4. Due to the linear guide 35 of the plunger 16 free of rotational play in the rotatable, axially fixed sleeve 17, the plunger can be driven exactly and without slippage by an appropriate drive apparatus. This has the advantage that both the drive motor 40 and the rotary drive device with the receptacle can be installed in the interior 41 of the housing of the processing station. It can even be provided that the receptacle 12 is retractable so far that it lies completely flush with the lid 42.

This arrangement can for instance be provided for an optical examination, in which the underside 43 of the CD 11 is illuminated by a light beam. It is important to see to it here that the surface can be illuminated during the rotation of the CD 11 by a line-form light beam, generally running radially. The required optical elements, such as light source 54, camera 53 and optical waveguide elements, are located underneath the lid 42 in the housing of the processing station. The appropriate openings and slots can be provided in the lid for the light beams to obtain the desired illumination of the CD.

The optical scanning can be done directly here in the extended position, which corresponds to the examination position of an axially rigid receptacle. The axial driving of the plunger and the sleeve require only slight construction space, which should be available even in the constricted housing of a processing station.

Figure 1:
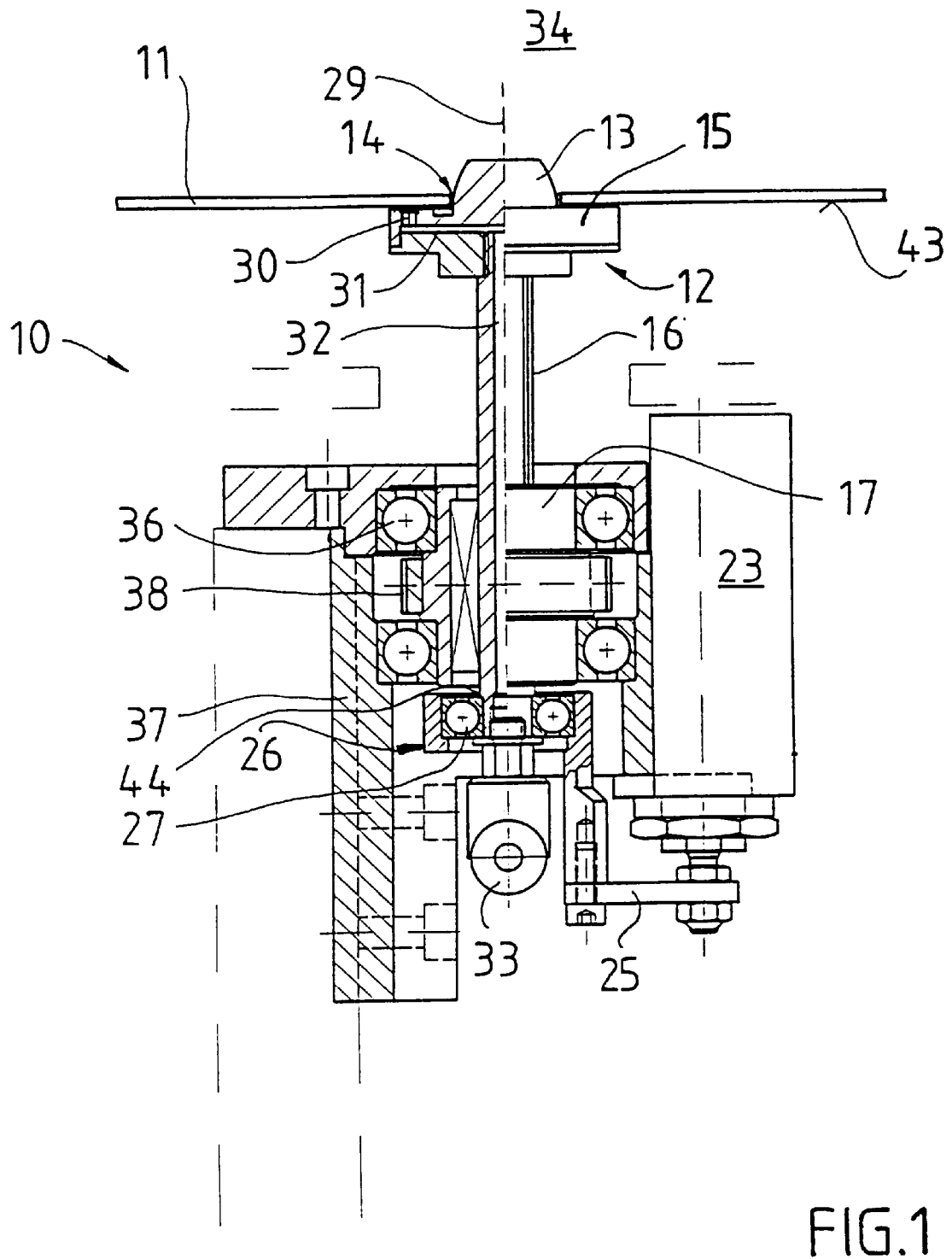

The operating sequence of the rotary drive device will now be schematically presented. The plunger 16 of the rotary drive device is located in the retracted position shown in FIG. 2. The conveyance means positions the CD 11 over the receptacle 12 so that the peg 13 and the center hole 14 of the CD 11 are in a single line. The piston cylinder drive 23 is subjected to the pressure medium, so that the piston 24 is drawn in and the plunger 16 extends outwards (FIG. 1). During this stroke motion in time for the taking up of CD 11 the through-holes 30 of the shoulder 15 are subjected to vacuum via the channels 31,32 and the coupling 33. The CD 11 is held by the receptacle 12 and held on it axially fixed and free of rotational play by the vacuum. The stroke travel here may amount to several cm.

For a conveyance means having a support on which the CD makes contact only under its own weight, the plunger 16 is extended further outwards in order to separate the CD from the conveyance means and to enable free rotation of the CD. The stops for limiting the stroke motion need only be set appropriately. For processing the CD 11, examining it, for instance, the motor 40 rotates the sleeve 17 and thus the plunger 16 with the receptacle 12 turns the CD 11 via the linear guide 35 free of rotational play. After the termination of the processing, the plunger 16 is again retracted by extending the piston 24, with the vacuum being shut off at the same time, so that the CD 11 can again be picked up by the conveyance means.

Insofar as the conveyance means has clamping elements or suction means to hold the CD 11 in place, the releasing of the CD by these elements must be synchronized with the stroke motion of the rotary drive device. Here it can be provided for the CD to be taken up by the receptacle and fixed in place on it and subsequently for the plunger to be retracted slightly in order to move it into the measuring or processing position. It can also be provided that the conveyance means drops the CD, and the CD is subsequently transported back by the plunger to the conveyance means after finishing the work step. However, the use of simple supports seems extremely practical, since then such an exact synchronization is not absolutely necessary.

With the rotary drive device of the above-described type, it is therefore possible for a processing station to be constructed such that the side 46 above the housing lid 42 is completely free. This makes a flexible adaptation of the processing station to existing production lines with preset conveyance or manipulation means possible without further effort. It is furthermore possible to bring the CD or the object by means of the axial stroke motion of the plunger into one or more arbitrary positions which are optimal for the respective processing step. It is possible in principle for the CD to be removed from the conveyance means and brought into the processing or measuring position by axial displacement.

Since it is now possible to create a processing station in which the CD or the object is completely free from above, it is possible for other processing and examination steps to be performed from above at the same time. Thus, an examination using a transmitted light process is easily possible, in which a camera or a light source is arranged above the object. An examination of the upper side of the CD or the object can also be performed.

The essential advantage of the rotary drive device is to be seen in the fact that the CD is almost completely free from both the upper and the lower side. Thereby a comprehensive examination of the CD can be performed, in particular by optical examination methods. The rotational motion is also completely independent of the stroke motion and of any pressure medium connection that may be provided, so that the rotary drive device can be optimally adapted to existing conveyance means. Moreover, a relatively long stroke travel of the plunger with the receptacle is possible, so that flexibility in installation into existing production lines is further enhanced.

The embodiment example above was described on the basis of a CD. It goes without saying that the invention also refers to other disc-shaped objects, such as CD-Rs, DVDs or other optical data media. Such data media exhibit the desired stiffness, so that excessive bending of the disc in the case of a centrally arranged data medium is not to be expected.

I claim:

1. A rotary drive device for use with an optical disc transported by a conveyor to a station, the optical disc having an upper surface, a lower surface and a center hole and being rotated about an axis orthogonal to the upper and lower surfaces of the optical disc at the station by the rotary drive device, comprising:

a plunger axially movable back and forth by a piston drive having a double-acting cylinder, each back and forth movement of said plunger defining a stroke with an extension velocity and a retraction velocity;

a receptacle arranged on said plunger for engaging the optical disc, said receptacle having at least one axially projecting guide for cooperating with the center hole of the optical disc to center the optical disc on said receptacle; and clamping means for releasably retaining the optical disc on said receptacle;

said extension velocity and said retraction velocity being independently adjustable;

said plunger being seated within a rotatable sleeve within a non-rotating linear guide such that said axial movement of the plunger is guided in a manner in which the plunger is free of rotational play;

said sleeve being rotatable by a drive motor via a belt to effect rotation of said plunger; and said piston drive being arranged parallel to and alongside said plunger and said sleeve and being connected to said plunger via a crosspiece;

whereby when the conveyor positions the optical disc above said receptacle, said plunger moves said receptacle into engagement with the optical disc and lifts the optical disc from the conveyor for rotation.

2. A rotary drive device for an optical disc which is transported by a conveyance means to a processing or examining station, in which the object is rotated during processing about an axis orthogonal to its surface extension by the rotary drive device, which contains a receptacle for the object and at least one axially projecting guidance means for centering the object that cooperates with a corresponding hole or recess in the object, and the object can be positioned by the conveyance means above the receptacle and releasable fixation or clamping means are provided to connect the object to the receptacle free of rotational play, characterized in that the receptacle is arranged on a plunger that can be moved back and forth, the plunger being guided to be axially movable in a linear guide free of rotational play inside a rotatable sleeve.

3. A rotary drive device according to claim 2, wherein the sleeve (17) is adapted to be driven.

4. A rotary drive device according to claim 3, wherein the sleeve is connected to a drive motor (40) via a belt (38).

5. A rotary drive device according to claim 2, wherein the sleeve and the plunger have axial grooves, and wherein the linear guide (35) has balls (18) that are guided in said axial grooves (21,22) of the sleeve (17) and the plunger (16).

6. A rotary drive device according to claim 2, wherein the clamping means includes a pressure pad that is arranged on a side of the object opposite the receptacle so that the object can be clamped in place between the receptacle and the pressure pad.

7. A rotary drive device according to claim 2, wherein the clamping means is arranged on the receptacle.

8. A rotary drive device according to claim 7, wherein the receptacle has a shoulder and a free end, said free end protrudes through the hole of the object, and wherein a portion of said free end which projects above the object has radially extensible balls that clamp the object in place on the shoulder.

9. A rotary drive device according to claim 8, wherein the radially extensible balls are extendable by an actuator means operated by a positive pressure.

10. A rotary drive device according to claim 7, wherein the receptacle has a shoulder which is essentially shaped like a flange and which is provided with at least one hole (30) on a surface (28) of the shoulder facing the object that is adapted to be subjected to a vacuum in order to draw the object into place by suction.

11. A rotary drive device according to claim 10, wherein the plunger has at least one channel (32) which is connected at one end to the at least one hole of the shoulder and which is connected at an opposite end remote from the receptacle to a vacuum source.

12. A rotary drive device according to claim 11, further comprising switching means for turning on the vacuum source during a stroke motion of the plunger before the shoulder of the receptacle contacts the object.

13. A rotary drive device according to claim 11, further comprising at least one valve for making a connection to the vacuum source during a stroke motion of the plunger before the shoulder of the receptacle contacts the object.

14. A rotary drive device according to claim 2, wherein the plunger is movable back and forth by a piston drive.

15. A rotary drive device according to claim 14, wherein the piston drive has a double-acting cylinder and wherein the stroke velocity includes an extension velocity and a retraction velocity which are independently adjustable.

16. A rotary drive device according to claim 14, wherein said piston drive (23) is arranged parallel to and alongside the plunger and is connected via a crosspiece (25) to the plunger.

17. A rotary drive device according to claim 14, wherein said piston drive is a pneumatic piston drive.

18. A rotary drive device according to claim 14, wherein said piston drive is a hydraulic piston drive.

19. A rotary drive device for an optical disc which is being transported by a conveyor capable of positioning the optical disc in a horizontal position directly above the rotary drive device, the optical disc having a lower surface and a center hole, said rotary drive device comprising:

a plunger located within a sleeve and axially extendable and retractable relative to said sleeve in a transverse direction relative to the optical disc, said plunger being non-rotatable relative to said sleeve and, when extended, being capable of engaging and elevating the optical disc above the conveyor;

a receptacle arranged on said plunger for engaging the optical disc, said receptacle having at least one axially projecting guide for cooperating with the center hole of the optical disc to center the optical disc on said receptacle;

means for releasably retaining the optical disc on said receptacle and for preventing rotation therebetween; and drive means for rotating said sleeve such that, when said plunger is extended and said receptacle is engaged to the optical disc, the optical disc is capable of being rotated about an axis orthogonal its lower surface.

20. A processing station for an optical disc having a lower surface and a center hole, comprising:

a conveyor capable of positioning the optical disc in a horizontal position directly above a rotary drive device;

said rotary drive device having a plunger located within a sleeve and axially extendable and retractable relative to said sleeve in a transverse direction relative to the optical disc, said plunger being non-rotatable relative to said sleeve and, when extended, being capable of engaging and elevating the optical disc above the conveyor;

a receptacle arranged on said plunger for engaging the optical disc, said receptacle having at least one axially projecting guide for cooperating with the center hole of the optical disc to center the optical disc on said receptacle;

means for releasably retaining the optical disc on said receptacle and for preventing rotation therebetween; and a drive motor for rotating said sleeve such that, when said plunger is extended and said receptacle is engaged to the optical disc, the optical disc is capable of being rotated about an axis orthogonal its lower surface.

21. A processing station according to claim 20, wherein the drive motor (40) and the rotary drive device (10) are located on a same side of a plane (42) which is perpendicular to the axis of rotation.

* * * * *